(12) United States Patent  
Shin

(10) Patent No.: US 8,053,705 B2
(45) Date of Patent: Nov. 8, 2011

(54) LASER ASSISTED MACHINING PROCESS WITH DISTRIBUTED LASERS

(75) Inventor: Yung C. Shin, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 1119 days.

(21) Appl. No.: 11/517,543

(22) Filed: Sep. 7, 2006

(65) Prior Publication Data

US 2007/0062920 A1    Mar. 22, 2007

Related U.S. Application Data

(60) Provisional application No. 60/714,799, filed on Sep. 7, 2005.

(51) Int. Cl.
B23K 26/00    (2006.01)

(52) U.S. Cl. .......... 219/121.76; 219/121.72; 219/121.83

(58) Field of Classification Search ............ 219/121.76, 219/121.67, 121.72, 121.68, 121.69, 121.85, 219/121.83, 121.62
See application file for complete search history.

(56) References Cited

U.S. PATENT DOCUMENTS

| | | | |
|---|---|---|---|
| 2,600,453 A * | 6/1952 | Weingart | 219/602 |
| 2,654,821 A * | 10/1953 | Gillett | 219/69.17 |
| 3,587,367 A * | 6/1971 | Dotson | 82/1.11 |
| 4,229,640 A | 10/1980 | Longo | |
| 4,352,973 A * | 10/1982 | Chase | 219/121.68 |
| 4,356,376 A * | 10/1982 | Komanduri et al. | 219/121.72 |
| 4,459,458 A | 7/1984 | Vetsch et al. | |
| 4,733,049 A * | 3/1988 | Lemelson | 219/121.69 |
| 4,749,840 A | 6/1988 | Piwczyk | |
| 4,857,697 A * | 8/1989 | Melville | 219/121.63 |
| 4,925,523 A * | 5/1990 | Braren et al. | 216/66 |
| 5,256,851 A * | 10/1993 | Presby | 219/121.69 |
| 5,698,121 A | 12/1997 | Kosaka et al. | |
| 5,837,960 A | 11/1998 | Lewis et al. | |
| 5,849,371 A | 12/1998 | Beesley | |
| 5,859,405 A * | 1/1999 | Golz et al. | 219/121.67 |
| 5,906,459 A | 5/1999 | Thomas et al. | |
| 6,122,564 A | 9/2000 | Koch et al. | |
| 6,218,642 B1 | 4/2001 | Christmas et al. | |
| 6,391,251 B1 | 5/2002 | Keicher et al. | |
| 6,393,687 B1 | 5/2002 | Friedrich | |
| 6,410,105 B1 | 6/2002 | Mazumder et al. | |
| 6,653,210 B2 | 11/2003 | Choo et al. | |
| 6,666,630 B2 | 12/2003 | Zimmermann et al. | |
| 6,811,744 B2 | 11/2004 | Keicher et al. | |
| 6,859,681 B1 | 2/2005 | Alexander | |
| 7,002,100 B2 | 2/2006 | Wu et al. | |
| 2003/0066822 A1 | 4/2003 | Kusnezow | |
| 2004/0173590 A1 | 9/2004 | Hata et al. | |

(Continued)

OTHER PUBLICATIONS

Lei, S. et al., "Deformation Mechanisms and Constitutive Modeling for Silicon Nitride Undergoing Laser-Assisted Machining," *International Journal of Machine Tools & Manufacture*, vol. 40, No. 15, Dec. 2000, pp. 2213-2233.

(Continued)

*Primary Examiner* — M. Alexandra Elve
(74) *Attorney, Agent, or Firm* — William F. Bahret

(57) ABSTRACT

Laser assisted machining process and machine utilizing multiple distributed laser units that are strategically distributed around the workpiece being machined to simultaneously heat the workpiece, creating a desired temperature distribution for laser assisted machining. Sequential incremental heating from different directions and positions are used, resulting in longer tool life and shorter machining time.

18 Claims, 2 Drawing Sheets

U.S. PATENT DOCUMENTS

2004/0206734 A1   10/2004   Horsting
2005/0006361 A1   1/2005    Kobayashi et al.

OTHER PUBLICATIONS

Lei, S. et al., "Experimental Investigation of Thermo-Mechanical Characteristics in Laser-Assisted Machining of Silicon Nitride Ceramics," *Journal of Manufacturing Science and Engineering*, vol. 123, Nov. 2001, pp. 639-646.

Pfefferkorn, F. et al., "Laser-Assisted Machining of Magnesia-Partially-Stabilized Zirconia," *Journal of Manufacturing Science and Engineering*, vol. 126, Issue 1, Feb. 2004, pp. 42-51.

Rebro, P. A. et al., "Design of Operating Conditions for Crackfree Laser-Assisted Machining of Mullite," *International Journal of Machine Tools & Manufacture*, vol. 44, No. 7-8, Jun. 2004, pp. 677-694.

Rebro, P. A. et al., "Laser-Assisted Machining of Reaction Sintered Mullite Ceramics," *Journal of Manufacturing Science and Engineering*, vol. 124, Nov. 2002, pp. 875-885.

Rebro, P.A. et al., "Comparative Assessment of Laser-Assisted Machining for Various Ceramics," *30th North American Manufacturing Research Conference*, May 21-24, 2002, West Lafayette, Indiana, 10 pgs.

Rozzi, J. C. et al., "Experimental Evaluation of the Laser Assisted Machining of Silicon Nitride Ceramics," *Journal of Manufacturing Science and Engineering*, vol. 122, No. 4, Nov. 2000, pp. 666-670.

Rozzi, J. C. et al., "Transient, Three-Dimensional Heat Transfer Model for the Laser Assisted Machining of Silicon Nitride: I. Comparison of Predictions With Measured Surface Temperature Histories," *International Journal of Heat and Mass Transfer*, vol. 43, No. 8, Apr. 15, 2000, pp. 1409-1424.

Shin, Y. C. et al., "Laser-Assisted Machining. Its Potential and Future," *Machining Technology*, vol. 11, No. 3, Third Quarter 2000, pp. 1-7.

Zhang, C. et al., "A Novel Laser-Assisted Truing and Dressing Technique for Vitrified CBN Wheels," *International Journal of Machine Tools and Manufacture*, vol. 42, No. 7, May 2002, pp. 825-835.

Kincade, K., untitled, LaserFocusWorld, c. May 2005, 5 pages.

"Laser Aided Manufacturing Processes Lab," [online], © 2003, University of Missouri-Rolla. Retrieved from the Internet: http://web.mst.edu/~lamp/.

"Laser Aided Material Deposition Process," [online], © 2003, University of Missouri-Rolla. Retrieved from the Internet: http://web.mst.edu/~lamp/laserprocess.shtml.

\* cited by examiner

LASER ASSISTED MACHINING PROCESS WITH DISTRIBUTED LASERS

CROSS-REFERENCE TO RELATED APPLICATION

This application claims the benefit of U.S. Provisional Patent Application Ser. No. 60/714,799, filed Sep. 7, 2005.

GOVERNMENT RIGHTS

This invention was made with government support under Contract/Grant No. DMI-0115172 awarded by the National Science Foundation. The government has certain rights in the invention.

TECHNICAL FIELD OF THE INVENTION

The present invention relates generally to laser assisted machining and, more particularly, to systems and processes that utilize multiple laser units to assist in machining a turning workpiece.

BACKGROUND OF THE INVENTION

Laser assisted machining is based upon the idea that the strength of materials generally decreases at elevated temperatures, and has been in use since the late 1970s when lasers became a viable heat source capable of producing intense heat in a very precise region. Laser assisted machining typically involves using a high power laser as a heat source to soften workpiece material ahead of a cutting tool in a lathe or milling machine, for example, to facilitate material removal and prolong tool life. FIG. 1 is a diagram of a typical laser assisted turning operation 10 utilizing a laser unit 12 to soften a workpiece 14 with a single laser spot 16 that locally elevates the temperature of the material before it is removed with a conventional cutting tool 18.

Due to inefficiencies associated with laser-metal interactions and high initial startup costs, economic justification for laser assisted machining of metals was not achieved, and interest in laser assisted machining was diverted to other areas of research. However, continued improvements in lasers, such as higher power Nd:Yag lasers and solid state diode lasers, have provided potential for improvements in laser assisted machining of metals. The present invention involves the use of multiple distributed lasers to assist in the machining of materials, such as ceramics, high temperature alloys, and composites, for example, which are typically difficult to machine.

SUMMARY OF THE INVENTION

One aspect of the present invention includes a turning process utilizing multiple distributed lasers to assist a cutting tool in machining a rotating workpiece. The process involves cutting material from the rotating workpiece with the cutting tool, thereby creating a chamfer on the rotating workpiece. A first laser unit is provided with independent operational control that heats the workpiece at a first point substantially circumferentially ahead of the cutting tool. A second laser unit is provided with independent operational control that heats the chamfer at a second point circumferentially behind said first point and ahead of the cutting tool, sequentially incrementally heating the rotating workpiece. Temperature gradients within the workpiece are controlled with the independent operational controls of the laser units.

Another aspect of the present invention involves a laser assisted machining apparatus. The apparatus includes a lathe having a workpiece holder that rotates about an axis and a cutting tool holder that moves along a path parallel to the rotational axis of said workpiece holder. First and second laser units are connected to said cutting tool holder and are controlled by a control means for independently controlling output of each of the laser units.

The objects and advantages of the present invention will be more apparent upon reading the following detailed description in conjunction with the accompanying drawings.

DETAILED DESCRIPTION OF THE PREFERRED EMBODIMENTS

Figure 1:
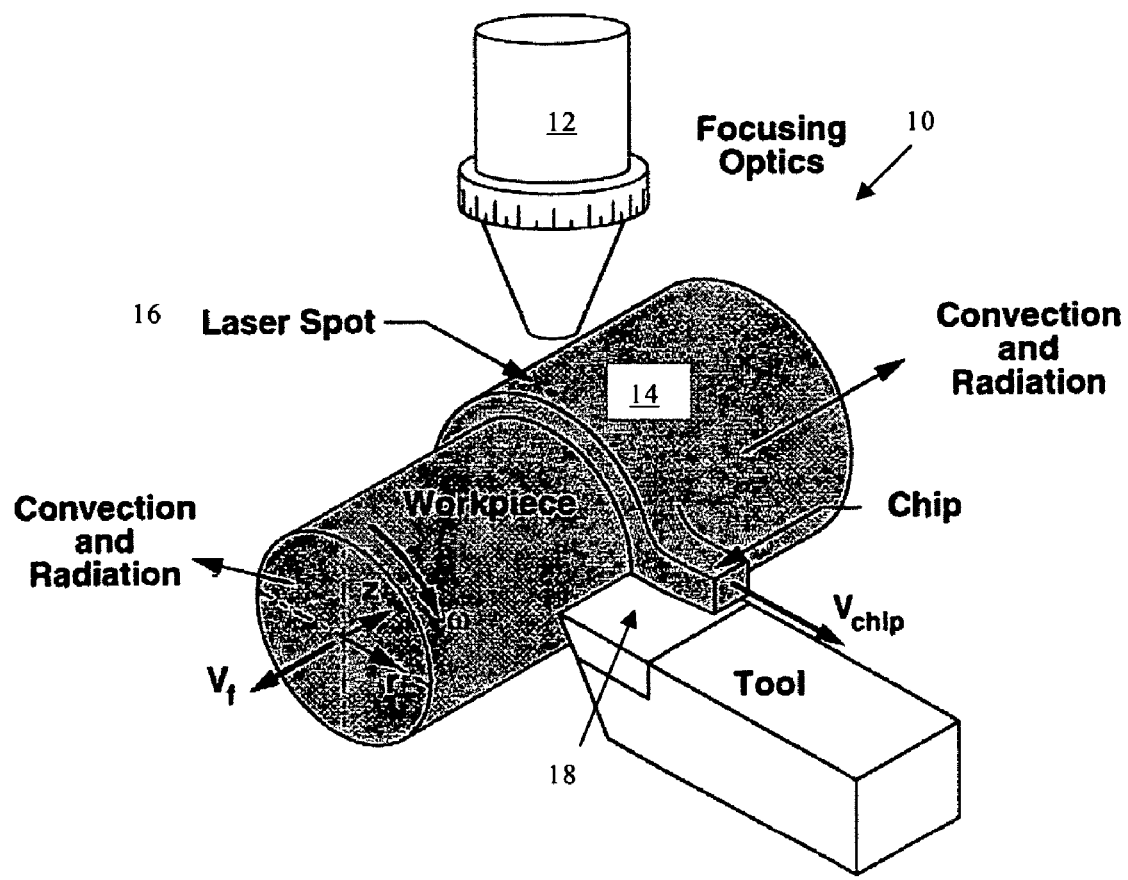
FIG. 1 is a diagram of a typical prior art laser assisted turning operation.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Figure 2:
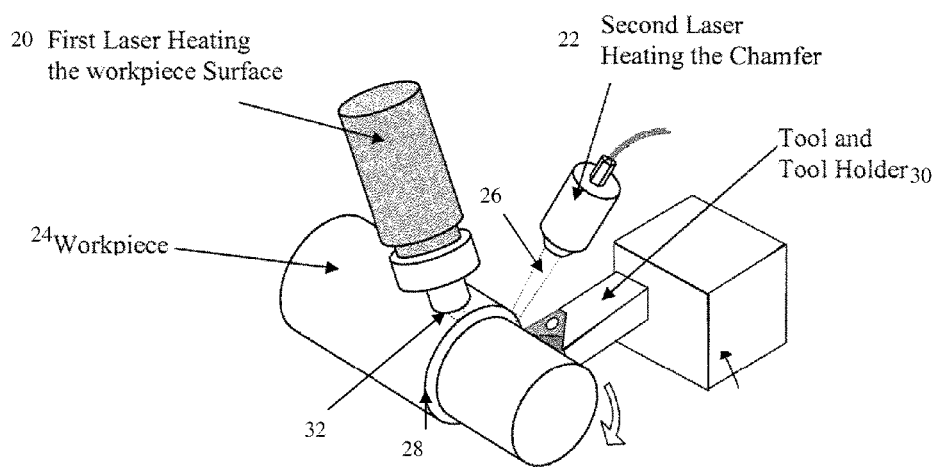
FIG. 2 is a diagram of a laser assisted turning process utilizing multiple distributed lasers according to one embodiment of the present invention.

One aspect of the present invention involves a turning process utilizing multiple distributed lasers to assist a cutting tool in machining a workpiece. FIG. 2 shows that laser units 20 and 22 are strategically positioned around workpiece 24 so that a desired temperature distribution that assists in the removal of material can be created within the workpiece. Laser beam 26 provided by laser unit 22 heats the chamfer 28 of the workpiece prior to cutting tool 30 removing material, while laser beam 32 provided by laser unit 20 heats the workpiece surface ahead of laser beam 26.

The multiple laser beams 26 and 32 provide sequential incremental heating from different directions and positions such that only the material zone to be removed reaches the temperature conducive to machining, while the remaining bulk material is relatively unaffected. Furthermore, sequential heating can generate surface treatment effects, which can improve absorptivity for the following laser beams, thereby significantly improving energy efficiency for the laser assisted machining of materials with high reflectivity such as metals.

Figure 3:
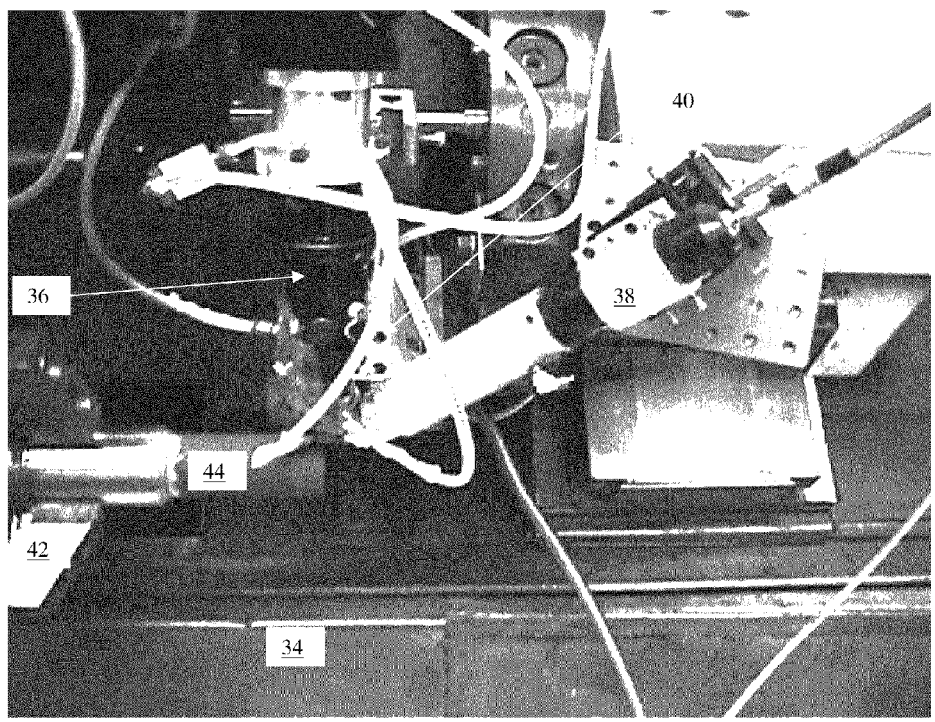
FIG. 3 shows a lathe with multiple distributed lasers for performing laser assisted turning operations according to another embodiment of the present invention.

Another aspect of the present invention involves a lathe with multiple distributed lasers for performing laser assisted turning operations. One embodiment of the lathe, used in turning austenitic stainless steel P550, is shown in FIG. 3. The lathe shown, 34, is a 60 hp Jones and Lambson turret lathe equipped with a NUM 1060 controller. The two laser units shown, 38 and 36, are a 500 W Nd:Yag laser and a 1.5 kW $CO_2$ laser, respectively.

Laser units 36 and 38 in the embodiment shown are connected to the cutting tool holder 40 of the lathe 34 so that they jointly translate with the cutting tool (not shown) as the cutting tool holder 40 moves along a path parallel to the rotational axis of the workpiece holder 42. Laser unit 38 is positioned about 10-13 degrees circumferentially ahead of the cutting tool, and laser unit 36 is positioned about 55 degrees circumferentially ahead of the cutting tool. Utilizing two independently controlled laser units allows more precise control over temperature gradients within the workpiece 44, avoids undesirable subsurface thermal damage, prevents microstructural change in the workpiece, and improves overall energy efficiency of the laser assisted machining process.

Laser assisted turning operations using the embodiment of the lathe shown in FIG. 3 resulted in a decrease in the overall time required to machine an austenitic stainless steel P550 workpiece 44 by 20-50% when compared with both carbide and conventional ceramic machining due to the higher machining speeds and longer tool life. The shorter machining times resulted in an estimated economic savings of 20-50%, when taking into account additional costs associated with operating and maintaining the laser units.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A turning process utilizing multiple distributed lasers to assist a cutting tool in machining a rotating workpiece, comprising:
   cutting material from the rotating workpiece with the cutting tool, thereby creating a circumferential chamfer on the rotating workpiece;
   providing a first laser unit with independent operational control;
   providing a second laser unit with independent operational control;
   sequentially, incrementally heating a small radially outer portion of the rotating workpiece with said first and second laser units prior to the cutting tool beginning to remove the small portion, the small portion including part of the chamfer surface, said sequential, incremental heating including
      preheating the small portion by directing the first laser beam onto its radially outermost surface when its circumferential position about the rotational axis of the rotating workpiece is substantially ahead of that of the cutting tool, and then
      further heating the small portion by directing the second laser beam onto its chamfer surface at a high angle thereto when its circumferential position is in close proximity to that of the cutting tool; and
   controlling temperature gradients within the workpiece with said independent operational controls of said first and second laser units.

2. The turning process of claim 1, wherein said circumferential position in close proximity to the cutting tool is from about 10 to about 13 degrees circumferentially ahead of the cutting tool.

3. The turning process of claim 2, wherein said circumferential position substantially ahead of the cutting tool is about 55 degrees circumferentially ahead of the cutting tool.

4. A turning process utilizing multiple distributed lasers to assist a cutting tool in machining a rotating workpiece, comprising:
   heating the rotating workpiece with a first laser unit by directing a first laser beam onto the workpiece at a first point
      axially ahead of the cutting tool relative to the travel direction thereof, and
      substantially circumferentially ahead of the cutting tool;
   heating the rotating workpiece with a second laser unit by directing a second laser beam onto the workpiece at a second point
      axially even with the cutting tool and on a chamfer of the workpiece, and
      circumferentially ahead of the cutting tool and substantially behind said first point;
   independently controlling power output of each of the laser units to control temperature gradients within the workpiece; and
   cutting heated material from the rotating workpiece with the cutting tool.

5. The turning process of claim 4, wherein said second point is from about 10 to about 13 degrees circumferentially ahead of the cutting tool.

6. The turning process of claim 5, wherein said first point is about 55 degrees circumferentially ahead of the cutting tool.

7. The turning process of claim 1, wherein said first and second laser units provide sequential incremental heating of the small radially outer portion of the rotating workpiece from different directions.

8. The turning process of claim 1, wherein said second laser unit comprises a solid-state laser and said first laser unit comprises a gas laser.

9. The turning process of claim 8, wherein said solid-state laser comprises a Yag laser and said gas laser comprises a $CO_2$ laser.

10. The turning process of claim 9, wherein said Yag laser comprises a Nd:Yag laser.

11. The turning process of claim 1, wherein said second laser unit comprises a laser with power output on the order of 500 W.

12. The turning process of claim 1, wherein said first laser unit comprises a laser with power output on the order of 1.5 kW.

13. A turning process utilizing multiple distributed lasers to assist a cutting tool in machining a rotating workpiece, comprising:
   cutting material from the rotating workpiece with the cutting tool, thereby creating a chamfer on the rotating workpiece;
   providing a first laser unit with independent operational control;
   heating the workpiece with said first laser unit at a first point circumferentially ahead of the cutting tool;
   providing a second laser unit with independent operational control;
   heating said chamfer with said second laser unit at a second point, circumferentially behind said first point and ahead of the cutting tool, thereby sequentially incrementally heating the rotating workpiece; and
   controlling temperature gradients within the workpiece with said independent operational controls of said first and second laser units,
   wherein said first laser unit comprises a higher-power laser than said second laser unit.

14. The turning process of claim 13, wherein said first point has a first circumferential position about a rotational axis of the rotating workpiece, said first circumferential position being at least 45 degrees ahead of that of the cutting tool.

15. The turning process of claim 13, wherein said second point has a second circumferential position about a rotational axis of the rotating workpiece, said second circumferential position being less than 15 degrees ahead of that of the cutting tool.

16. The turning process of claim 13, wherein said heating of said chamfer includes directing a beam from said second laser unit onto said chamfer at a high angle thereto.

17. The turning process of claim 16, wherein said beam impinges substantially perpendicularly upon said chamfer.

18. The turning process of claim 4, wherein the second beam impinges substantially perpendicularly upon said chamfer.

* * * * *